March 16, 1926.
N. S. DIAMANT
RADIATOR CORE
Filed August 3, 1921   2 Sheets-Sheet 1
1,577,115
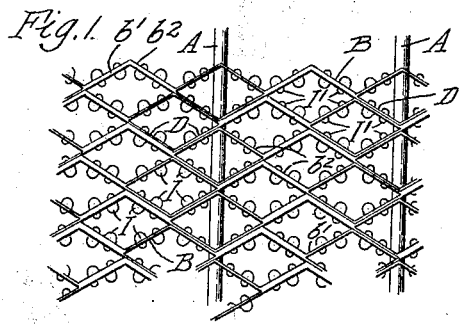
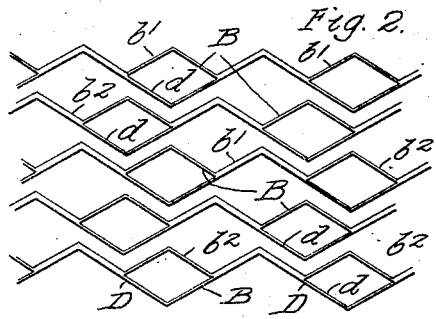
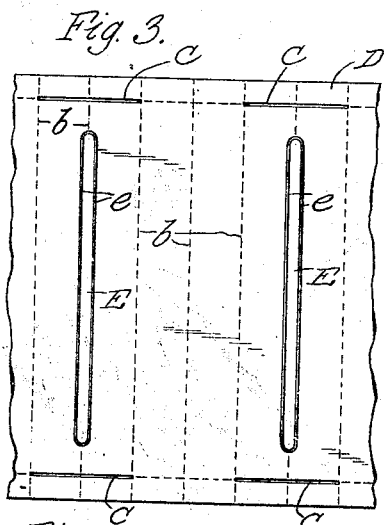
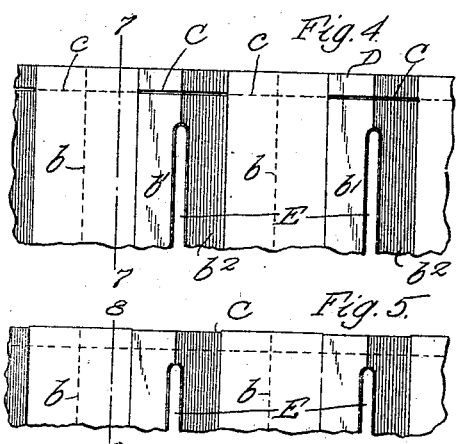
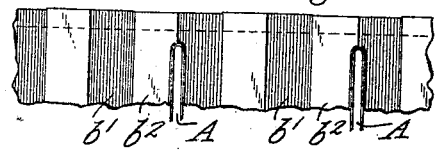
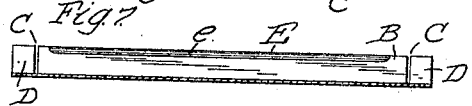
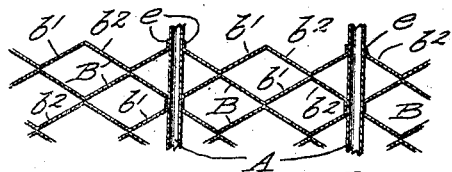
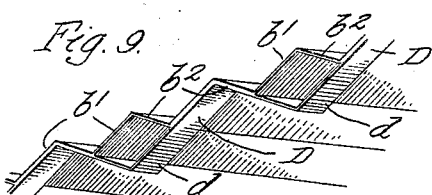
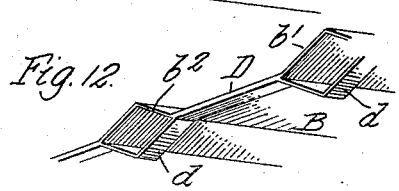
INVENTOR.
Nicholas S. Diamant,
by Parker & Fro'now.
ATTORNEYS.

March 16, 1926.

N. S. DIAMANT

RADIATOR CORE

Filed August 3, 1921    2 Sheets-Sheet 2

INVENTOR
Nicholas S. Diamant,
By Parker & Prochnow.
ATTORNEYS

Patented Mar. 16, 1926.

1,577,115

UNITED STATES PATENT OFFICE.

NICHOLAS S. DIAMANT, OF LOCKPORT, NEW YORK.

RADIATOR CORE.

Application filed August 3, 1921. Serial No. 489,463.

*To all whom it may concern:*

Be it known that I, NICHOLAS S. DIAMANT, residing at Lockport, in the county of Niagara and State of New York, have invented a new and useful Improvement in Radiator Cores, of which the following is a specification.

This invention relates to radiators of the kind commonly used for dissipating the heat of the cooling medium used in an internal combustion engine or other device, and more particularly to radiators of this kind provided with substantially upright water or steam tubes and radiating fins which conduct heat from the tubes.

The objects of this invention are to provide a radiator of this kind with radiating fins of improved construction which are so formed and arranged as to increase the efficiency of radiators of this kind; also to provide means of improved construction for spacing the radiating fins in the desired relation to each other; also to so form the fins as to produce an irregular flow of air through the air passages of the radiator, to increase the efficiency of the same; also to improve the construction of radiators of this kind in other respects hereinafter specified.

In the accompanying drawings:

Fig. 1 is a front elevation of a portion of a radiator core embodying the invention.

Fig. 2 is a view showing the fins of the radiator core separated for the purpose of more clearly illustrating their structure.

Fig. 3 is a fragmentary face view of a blank from which one of the radiating fins is made.

Figs. 4, 5 and 6 are similar fragmentary views showing different steps in the formation of the radiating fins.

Figs. 7 and 8 are sectional views thereof on lines 7—7 and 8—8 on Figs. 4 and 5 respectively.

Fig. 9 is a perspective view of one of the fins.

Fig. 10 is a fragmentary sectional elevation of a radiator core embodying the invention.

Fig. 11 is a fragmentary sectional elevation thereof showing means embodying the invention for producing an irregular flow of air through the air passages of the radiator.

Fig. 12 is a perspective view of a partly completed fin.

Figure 13:
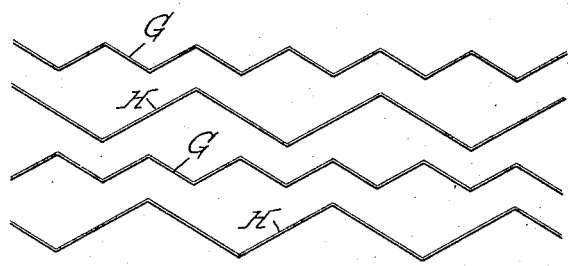

Fig. 13 is a view showing fins and spacing members of modified construction and separated from each other.

Figure 14:
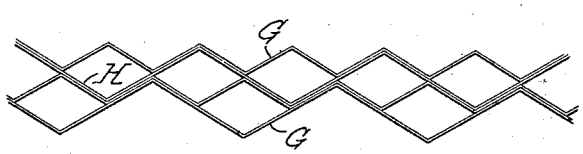

Fig. 14 is a view similar to Fig. 13 showing the fins and spacing members in operative relation to each other.

Figure 15:
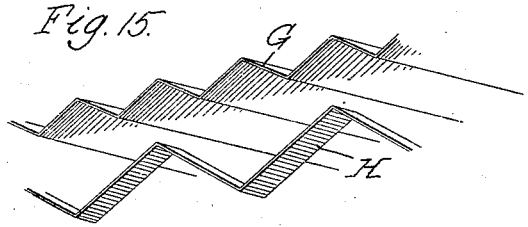

Fig. 15 is a perspective view of a fin and spacing member spaced apart.

Figure 16:
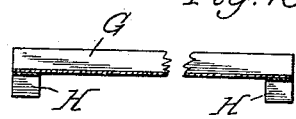

Fig. 16 is a sectional elevation of a fin and spacing member.

Figures 17, 18:
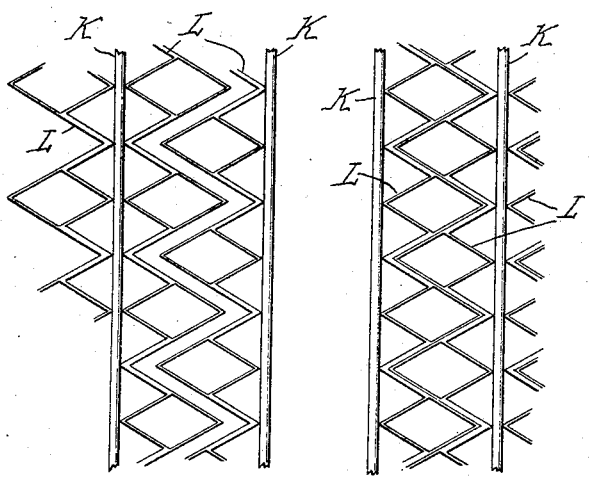

Figs. 17 and 18 are fragmentary elevations of a radiator core having the radiating fins differently arranged, Fig. 17 showing the adjacent fins spaced apart to better illustrate the structure thereof.

The radiator in connection with which the invention is shown in the accompanying drawings has a plurality of substantially upright tubes A spaced apart and conducting the medium to be cooled from one to another reservoir of the radiator, the reservoirs not being shown. Some of the heat of the medium to be cooled is transferred directly from the tubes to the air passing through the radiator, and radiating fins are also provided which contact with the tubes and by means of which heat is dissipated by being transferred from the radiating fins to the air contacting therewith. These tubes are preferably provided with flat sides which extend substantially from the front to the rear faces of the radiator core.

The radiating fins in the construction shown comprise strips or bands of metal which are bent into corrugated or zig-zag shape and the radiating fins are so spaced relatively to each other as to form a plurality of air passages through the radiator from the front to the rear faces thereof. The air passages may be of any desired form, those shown being four-sided or substantially diamond shaped in cross section. In order to form the fins in this manner, the strips from which the fins are formed are bent alternately in opposite directions along the dotted lines $b$ shown in Fig. 3, thus forming radiating fins B having the zig-zag formation shown in the drawings, and provided with alternately oppositely directed faces $b'$ $b^2$, all of the faces $b'$ $b^2$ being of the same size.

It is desired to space the radiating fins in such relation to each other that the bent edges of the fins contact with or are arranged in close proximity to the bent edges of adjacent fins, preferably in such a manner as to form substantially diamond shaped air passages. In order to effect the desired spacing of the fins relatively to each other, spacing means are provided which are preferably arranged at the front and rear faces of the radiator. In the construction shown in Figs. 1 to 12 inclusive, the radiating fins are provided with spacing strips D which are formed integral therewith. In order to produce fins having integral strips, the blanks from which the fins are made are provided adjacent and parallel to their edge portions with slits C, which are of a length equal to the width of two faces $b'$ $b^2$ of the strip. Each slit C extends through two adjacent faces $b'$ $b^2$ and is spaced from adjacent slits by a similar distance. After the slits have been made in the strips, those portions only of the blank which have been slit are bent into the desired shape, as shown in Fig. 4, thus forming the faces $b'$ $b^2$ through which the slits extend, while the portions of the strip between the slits are left unbent or flat. After this operation the edge portions of the blank are bent through an angle of about 180° along the lines indicated in Fig. 4 by $c$, these lines being substantially continuations of the slits C. After the edges have been turned over in this manner, the fin presents the appearance shown in Figs. 5 and 12 in which the bent portions of the fin and integral spacing member form substantially diamond shaped figures and in which the portions between the bent portions are flat. The next step in the formation of the fins consists in bending these flat portions to give them the same half diamond shaped form of the portions already bent, thus completing the fins. The fins then have the appearance shown in Figs. 6 and 9, the faces $b'$ $b^2$ thereof forming a plurality of half diamond shaped portions and the spacing members or edges D having half diamond shaped parts of twice the size of the body portions of the fin, the outer portions $d$ of which extend beyond or away from the body portions of the fin into positions to engage between the faces $b'$ $b^2$ of an adjacent fin to hold the fins in spaced relation to each other. The spacing members, therefore, have about twice the pitch of the corrugations of the fins and extend from the concave, bent edge portion of one radiating fin into the concave, bent portion of an adjacent fin, the spacing members shown extending substantially parallel to the faces of the fins. In building up the radiator, the fins are arranged as shown in Fig. 2 and when moved into engagement form a radiator core having the appearance shown in Fig. 1. By means of this arrangement the fins form diamond shaped air passages as shown in the sectional view, Fig. 10, in which it will be observed that by using the diamond shaped air passages, the fins at the intermediate portions of the radiator contact only along edges so that the air passages are all formed by single thicknesses of metal, the portions of greater thicknesses being only at the extreme edge portions of the radiating fins. By means of this arrangement a very efficient use is made of the metal in the radiating fins.

The radiating fins may be provided with the usual slots or apertures E through which the tubes A extend, these apertures being preferably formed in such a manner that the metal at the edges $e$ of the apertures is bent or flanged to lie flatly against the sides of the tubes as shown in Fig. 10, whereby a good thermal contact is obtained for insuring an efficient transmission of the heat from the tubes to the radiating fins.

In the modified construction shown in Figs. 13 to 16 inclusive, the radiating fins are provided with spacing members, which are not formed integral with the fins. In this construction, G represents the radiating fins and H the spacing members, the radiating fins being of zig-zag, corrugated or half diamond shape, and the spacing members being of similar shape but having the bends spaced twice as far apart. Consequently, when the fins and spacing members are assembled they are arranged in the relation to each other as indicated in Fig. 13, and when assembled present the appearance shown in Fig. 14. In this construction the spacing members may be made of thicker or stronger and also cheaper material than that used in the radiating fins. This adds strength to the radiator without reducing the efficiency thereof.

In both of the forms shown, the assembling of the radiator is greatly facilitated, since the fins and spacing members naturally tend to seek the correct positions relatively to each other and are held against movement out of these positions by the peculiar construction of the spacing members and fins.

It is well known that in order to produce the best cooling effects the passage of the air through the radiator must be interrupted or broken up in such a manner as to insure that the air contacting with the heated surfaces will be mixed with the air passing through the intermediate portions of the air passages, or in other words, to bring the air passing through the intermediate portions of the air passages into contact with the heated surfaces. The construction of the radiating fins described, lends itself readily to such changes in shape of the radiating surfaces thereof as may be desired. In the construction shown in Figs. 1 and 11, the fins are provided with rounded or knob-like projections or deformations I and I'  which are spaced at intervals on the radiating fins and extend into the air passages. The projections I which are nearest to the center of the diamond-shaped passages are preferably made larger than the deformations I' which are arranged adjacent to the acute angles of the diamond-shaped passages. The object of this arrangement is to prevent the projections adjacent to the acute angles of the passages from excessively obstructing the flow of air in these parts of the passages, whereas the projections I near the middle portions of the passages are made larger to insure a breaking up of the column of air flowing through the middle portions of the air passages. By means of the deformations of the fins, the air velocity distribution in each cell can be made substantially uniform. The knob-like projections on the fins can be readily varied in size or entirely omitted in the design of radiators so that the resistance to the flow of air through the radiator can be controlled as may be desired. These deformations of the radiating fins may, if desired, be omitted or other means for breaking up the flow of air through the air passages may be provided.

In Figs. 17 and 18, a different arrangement of the radiating fins is shown, the fins in this case being arranged substantially parallel with the tubes. In these figures K represents the tubes and L the fins provided with the integral spacing members. The edges of these radiating fins are in contact with the tubes and no perforation or slotting of the fins is necessary to permit the tubes to extend therethrough.

Radiators provided with radiating fins of the kind described are particularly desirable, since the fins lend themselves readily to changes or modifications of radiator design. The angles at which the parts of the fins are bent can easily be varied to produce different appearances and to provide more or less indirect radiating surface. The radiator is attractive in appearance and is mechanically strong. The radiator is also thermally efficient since the amount of material required for purposes of alining the fins is reduced to a minimum, and has the appearance of a cellular radiator.

I claim as my invention:

1. In a radiator, the combination of tubes for the medium to be cooled, radiating fins which engage said tubes to conduct heat therefrom, the portions of said fins which are arranged between adjacent tubes being imperforate, said fins being bent to form a plurality of pairs of equal, oppositely disposed faces, a single bent edge separating each of said faces from an adjacent face, and means at the edges of said fins for spacing said fins so that the bent edges of each fin are arranged in immediate proximity to the bent edges of adjacent fins to form air passages of substantially diamond shaped cross section.

2. In a radiator, the combination of tubes for the medium to be cooled, radiating fins which engage said tubes to conduct heat therefrom, the portions of said fins which are arranged between adjacent tubes being imperforate, each of said fins being bent to form a plurality of pairs of equal, oppositely disposed faces, and means independent of said tubes for spacing said radiating fins lengthwise with regard to each other so that each pair of oppositely disposed faces forms one half of an air passage of substantially diamond shaped cross section.

3. In a radiator, the combination of substantially flat-sided tubes for the medium to be cooled, radiating fins extending transversely of said tubes and provided with apertures through which said tubes extend, said radiating fins being bent to form a plurality of pairs of equal oppositely disposed faces, each of said faces being separated from an adjacent face by a single bent edge, said fins being spaced so that the bent edges thereof are arranged in immediate proximity to the bent edges of adjacent fins to form air passages of substantially diamond shaped cross section.

4. In a radiator, the combination of tubes for the medium to be cooled, radiating fins engaging said tubes to conduct heat therefrom, said fins being bent to form a plurality of pairs of equal oppositely disposed faces separated from each other by single bent edges, and spacing members arranged between adjacent fins and bent to form equal oppositely disposed parts of approximately twice the length of said faces of said fins, each of said parts being adapted to extend from the concave bent portion of one fin into the concave bent portion of an adjacent fin for positioning said fins to form air passages of substantially diamond shaped cross section.

5. In a radiator, the combination of tubes for the medium to be cooled, radiating fins engaging said tubes to conduct heat therefrom and bent to form corrugations, and spacing members bent to extend into a corrugation of a fin and beyond said fin into a corrugation of an adjacent fin to space said fins relatively to each other.

6. In a radiator, the combination of tubes for the medium to be cooled, radiating fins engaging said tubes to conduct heat therefrom and bent to form a plurality of pairs of oppositely disposed parts, each part being arranged at an angle to the adjacent parts, the alternate parts being substantially parallel to each other, and a spacing member provided with similarly arranged parts of approximately twice the distance between bends, each of the parts of said spacing member being arranged in contact with a part of each of two adjacent fins for spacing said fins.

7. In a radiator, the combination of tubes for the medium to be cooled, radiating fins engaging said tubes to conduct heat therefrom and bent to form corrugations, and spacing members bent to form corrugations of approximately twice the span of the corrugations of said fins, each of the corrugations of said spacing members extending into alternate corrugations of two adjacent fins for spacing said fins.

8. In a radiator, the combination of tubes for the medium to be cooled, radiating fins engaging said tubes to conduct heat therefrom and bent to form a plurality of pairs of oppositely disposed parts, each part being arranged at an angle to the adjacent parts, the alternate parts being substantially parallel to each other, and a spacing member provided with similarly arranged parts of approximately twice the distance between bends, each of the parts of said spacing member being arranged in contact with a part of each of two adjacent fins for spacing said fins, said spacing members being formed integral with said fins.

9. In a radiator, the combination of tubes for the medium to be cooled, radiating fins engaging said tubes to conduct heat therefrom, said fins being bent to form a plurality of air passages of diamond shaped cross section, and knob-like projections on said fins extending into said air passages, the projections adjacent to the acute angles of the cross section of said passages being smaller than the projections adjacent to the middle portions of said passages.

NICHOLAS S. DIAMANT.